United States Patent
Kahn et al.

(10) Patent No.: US 7,593,960 B2
(45) Date of Patent: Sep. 22, 2009

(54) SYSTEM AND METHOD FOR LEAST WORK PUBLISHING

(75) Inventors: Roger Kahn, Brooklyn, NY (US); Hareesh Kadlabalu, Port Washington, NY (US)

(73) Assignee: Fatwire Corporation, Mineola, NY (US)

( * ) Notice: Subject to any disclaimer, the term of this patent is extended or adjusted under 35 U.S.C. 154(b) by 104 days.

(21) Appl. No.: 09/885,681

(22) Filed: Jun. 20, 2001

(65) Prior Publication Data

US 2002/0065976 A1    May 30, 2002

(51) Int. Cl.
   *G06F 17/30* (2006.01)
   *G06F 7/00* (2006.01)

(52) U.S. Cl. ............... 707/104.1; 707/10; 707/102

(58) Field of Classification Search ........... 711/133, 711/118, 163; 707/3, 203, 10, 104.1, 102; 709/203
   See application file for complete search history.

(56) References Cited

U.S. PATENT DOCUMENTS

| | | | | |
|---|---|---|---|---|
| 5,987,506 A | | 11/1999 | Carter et al. ............... 709/213 |
| 6,012,087 A | * | 1/2000 | Freivald et al. ............ 709/218 |
| 6,216,212 B1 | * | 4/2001 | Challenger et al. .......... 711/163 |
| 6,226,618 B1 | | 5/2001 | Downs et al. ................. 705/1 |
| 6,247,032 B1 | * | 6/2001 | Bernardo et al. ............ 715/530 |
| 6,360,215 B1 | * | 3/2002 | Judd et al. ..................... 707/3 |
| 6,366,933 B1 | * | 4/2002 | Ball et al. ................... 715/511 |
| 6,457,103 B1 | * | 9/2002 | Challenger et al. .......... 711/133 |
| 6,484,149 B1 | * | 11/2002 | Jammes et al. ............... 705/26 |
| 6,557,076 B1 | * | 4/2003 | Copeland et al. ............ 711/118 |
| 6,560,639 B1 | * | 5/2003 | Dan et al. .................... 709/218 |
| 6,584,548 B1 | * | 6/2003 | Bourne et al. ............... 711/134 |
| 6,606,604 B1 | * | 8/2003 | Dutta ........................... 705/26 |
| 6,615,235 B1 | * | 9/2003 | Copeland et al. ............ 709/203 |
| 6,732,142 B1 | * | 5/2004 | Bates et al. .................. 709/203 |

* cited by examiner

*Primary Examiner*—Kuen S Lu
(74) *Attorney, Agent, or Firm*—K& L Gates LLP

(57) ABSTRACT

Systems and corresponding methods are provided for determining when a content page contains out of date content items as a result of changes made to the content items, which systems comprises a template engine operative to generate a content page comprising content items that are associated with time stamp information to indicate the last time the content item was modified. One or more dependency records are generated to store information regarding the relationship between content items that comprise the content page and the content items stored in the data source, which is compared with time stamp information contained in the data source for each content item, to determine through the comparison those content pages that contain content items that have been modified in the data source, and to instruct the template engine to re-generate the content page.

30 Claims, 4 Drawing Sheets

SYSTEM AND METHOD FOR LEAST WORK PUBLISHING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to the generation of web sites that contain web pages derived from databases and templates. More particularly, the present invention relates to a system and method whereby a content management system can quickly determine which web pages have become stale as a result of changes to the content contained in the underlying database. Once the system makes the determination, it re-creates the stale web pages with new content. The present system and method allow a business with a web presence to save time and resources by having the content management system automatically detect stale web pages. Only then can the system selectively re-create those web pages with newer content, instead of also re-creating pages that are unaffected by changes to content in the database.

Database driven content management systems are typically used to automate information management for large-scale, high-volume online operations. Such systems are capable of generating every page in a web site dynamically, e.g., at run time when the user requests the page. Dynamic pages are designed to display time-variant, user-dependent information. Examples of dynamic web pages are personalized mailboxes, customized order forms, and a web page designed to present a user with his or her favorite news topics. Since the information and layout of these types of pages changes depending on the time they are accessed, or who they are accessed by, they must be generated at run time when the user requests the page. The content displayed by the dynamic page is stored in a database or other data management system.

A runtime engine interprets the instructions contained within the dynamic page. Web application servers such as WebLogic and WebSphere provide this runtime engine. The instructions and variables that make up the dynamic page may be written in a variety of programming languages or scripting languages or both. Exemplary scripting languages include JavaServer Pages(JSP), JavaScipt, VBScript, JScript, ASP (Active Server Pages), Python, and Perl. A piece of program logic written in these languages is broadly known as a 'template.' The runtime engine interprets/executes these coded instructions at runtime upon request, resulting in a stream of data. Requests are typically generated from a browser (Internet Explorer, Netscape Navigator or such) and the result of execution, in the form of stream of data is transmitted back to the browser that requested it. The stream of data is generated in a format that is understood by Web browsers, e.g., HTML (Hypertext Markup Language) or XML (eXtensible Markup Language).

Dynamic generation, however, consumes computational resources and time. Additionally, dynamic generation is not required for web pages displaying content that does not change with users or time, for example, a research publication. When dynamic generation is not required, web masters are better served by static pages. A static page is a physical file that is stored in a file system, typically with HTML, SHTML or HTM extensions. Upon request, such a static page is rendered to the requesting browser. Rendering static pages is facilitated by the use of a web server such as Apache Web Server, IBM Web Server, or Internet Information Server (IIS). A web server is software capable of reading such files on the file system and transmitting them across the network to the requesting browser or an equivalent program. Most web servers employ sophisticated mechanisms such as page caching that provide higher access times for static pages. Because rendering static pages does not involve computation of the page itself, static pages can be delivered at higher performance when compared to dynamic delivery.

The overhead involved in the use of static pages arises when their underlying data is modified. When the underlying data is modified, these static pages become stale and must be regenerated to reflect the modifications. In a large website consisting of thousands of static pages, identifying which of the static pages must be regenerated becomes critical. Without this identification, the system would be often forced to regenerate even those pages whose underlying data did not change. This sometimes offsets the advantage of the higher performance of static pages over dynamic pages. The fact is that the typical content management system is unable to efficiently handle the republication of static pages in volume; specifically, when content in the database is changed regularly, these changes could affect tens of thousands of static pages. Because the content management system cannot determine which static pages are affected by the changes, it either indiscriminately re-creates current pages along with the stale pages, or it requires a human operator to manually determine and specify which static pages to re-create. Recreating static pages by manually determining which pages are stale can require hundreds of man-hours.

There is thus a need for a system that can automatically and quickly determine which static web pages are stale. There is also a need for the system to selectively republish only the stale pages using current content, instead of republishing the entire site. There is also a need for the system to optimize the republication process. Such as system makes it possible for businesses to benefit from the high performance that they expect when they choose static pages over dynamic pages.

BRIEF SUMMARY OF THE INVENTION

It is an object of the present invention to provide a system and method for high-performance content management that automatically determines which static content pages have become stale as a result of changes to the data in the underlying data source or template.

It is another object of the present invention to provide a solution to the problems associated with the republication of stale pages, in particular, the problem of having to republish pages that are not stale.

The above and other objects are achieved by a system and method that architecturally separates system components into three entities: dependency checking software; templates; a template engine, which simultaneously creates content pages and dependency records for those pages. Dependency records store information that describes how a content page is created from the data source by the template and therefore how the content page depends on the data source and the template. Dependency records allow the present invention to achieve the above-mentioned objectives.

The data source is a database or other storage system that is used to store the raw data. The data source also contains a time stamp for each unit of data, indicating when the data was created or most recently modified. The raw data is processed by the template engine executing one or more templates such that a file results. At run time, the file is presented by the web server to the requesting computer as a static content page.

A template instructs the template engine to process data from the data source in order to output content pages to disk, e.g., a template specifies which locations in the data source are to be read for the data they contain, and specifies the format and layout of the data by means of a markup language, such as HTML or XML, although alternative languages are contemplated by the invention. A template can be programmed to output one content page or many content pages, each containing different instances of the same class of information. When a template is first created or later reprogrammed, its compilation date and time are recorded by the content management system.

The publication process is initiated by the user when he or she instructs the system to create a content page and save it to disk, or it can be automatically initiated by the system upon modification to the data source. The publication process consists of the template engine executing the template that is associated with the content page and creating dependency records for the content page. When the template is executed, it refers to the data source, reads the required data, retrieves and formats the data, writes both the data and its format to a file, and saves the file to disk. The file is published when it is saved to disk. Thus, executing a template is equivalent to publishing a file. Each such file is equivalent to a static content page. At run time, when a content page is requested, the web server delivers the appropriate HTML file from the disk to the requesting computer.

Whereas the HTML file stores the actual data that makes up the content page, its dependency records store information that describes how this file was created from the data source by the template and therefore how the file depends on both the data source and the template. The dependency records will be used by the dependency checking software to run dependency checks when re-publication is requested. The dependency checking software compares the information in the dependency records against the data source and the template. Based on these comparisons, the dependency checking software determines which pages require republication. Examples of changes could be modifications to the underlying data and changes to the publishing template since the last publication.

Dependency records created during the initial publication of a file contain the following types of information for the file:

a) Parameters that are passed to the template. Parameters are name/value pairs of information that are passed to a template engine for its use during the publication of a specific file. Parameters are typically used for passing runtime data for the template engine. These might be presented in the file that is published to the file system or may be used in the program logic. A parameter can thus affect which data and how data appear in the published file, and hence the content page. If the parameters to the template change, so does the template's behavior. Parameters thus become a part of the dependency check. If for the template, the passed parameters change after the last publication time of the file, the existing file is deemed to be stale.

b) Reads made from the data source by the template, e.g., locations in the data source that are read by the template for the data they contain. Reads include time stamps.

c) Queries that are run on the data source by the template, along with the number of records that are returned by each query. Later, the query can be performed and the time stamps for the returned fields will be compared with the time of the file's last publication to determine if the file is stale.

d) Which sub-templates, if any, are called by the template. A template can be programmed to call one or more sub-templates to create parts of the content page or perform program logic. A template along with all sub-templates that it may call, determine what data and how the data is presented in the published file, and hence the resulting content page. For example, all pages in a web site may have a common header. A sub-template that produces the header would be created. The sub-template would then be called by all templates to place a header at the top of each file, and hence, each content page. All dependencies of the sub-templates must be tracked in order for the system to comprehensively check for the need to republish. Each sub-template is checked for changes through the dependency checking process when file republication is requested.

e) File publication time, e.g., the date and time that the file is published.

Once the initial dependency records for a file are established, the system can determine against them whether raw data or templates have since been changed, and hence, whether a file has become stale as a result.

The components distributed across the system architecture generally work together as follows:

When a page designer wishes to publish a static content page for the first time, the designer writes and saves a template to the content management system. The page designer then instructs the content management system to publish the file. The content management system responds by instructing the template engine to execute the template as previously described and create dependency records as previously described.

The page designer now updates certain data in the data source and saves the changes. The content management system simultaneously updates all the time stamps in the data source for each unit of data that was modified. The page designer instructs the system to republish files. The content management system instructs the dependency checking software to check the dependencies previously described. The dependency checking software checks for staleness of the static pages and passes the results to the template engine, which then republishes only the static pages that were determined to be stale. Once all dependencies for a file are checked and recorded, the file is said to be cached.

The solutions provided by the present invention solve problems associated with the prior art through the use of a content management system that automatically detects stale static content pages. The solution further allows the system to selectively republish only those static pages that have become stale. The solution further allows the system to minimize the time it uses to complete the republication process and thus optimize its own performance. The high performance of such a content management system therefore justifies the use of static pages when necessary.

BRIEF DESCRIPTION OF THE DRAWINGS

The invention is illustrated in the figures of the accompanying drawings which are meant to be exemplary and not limiting, in which like references are intended to refer to like or corresponding parts, in which.

DETAILED DESCRIPTION OF THE PREFERRED EMBODIMENTS

Figure 1:
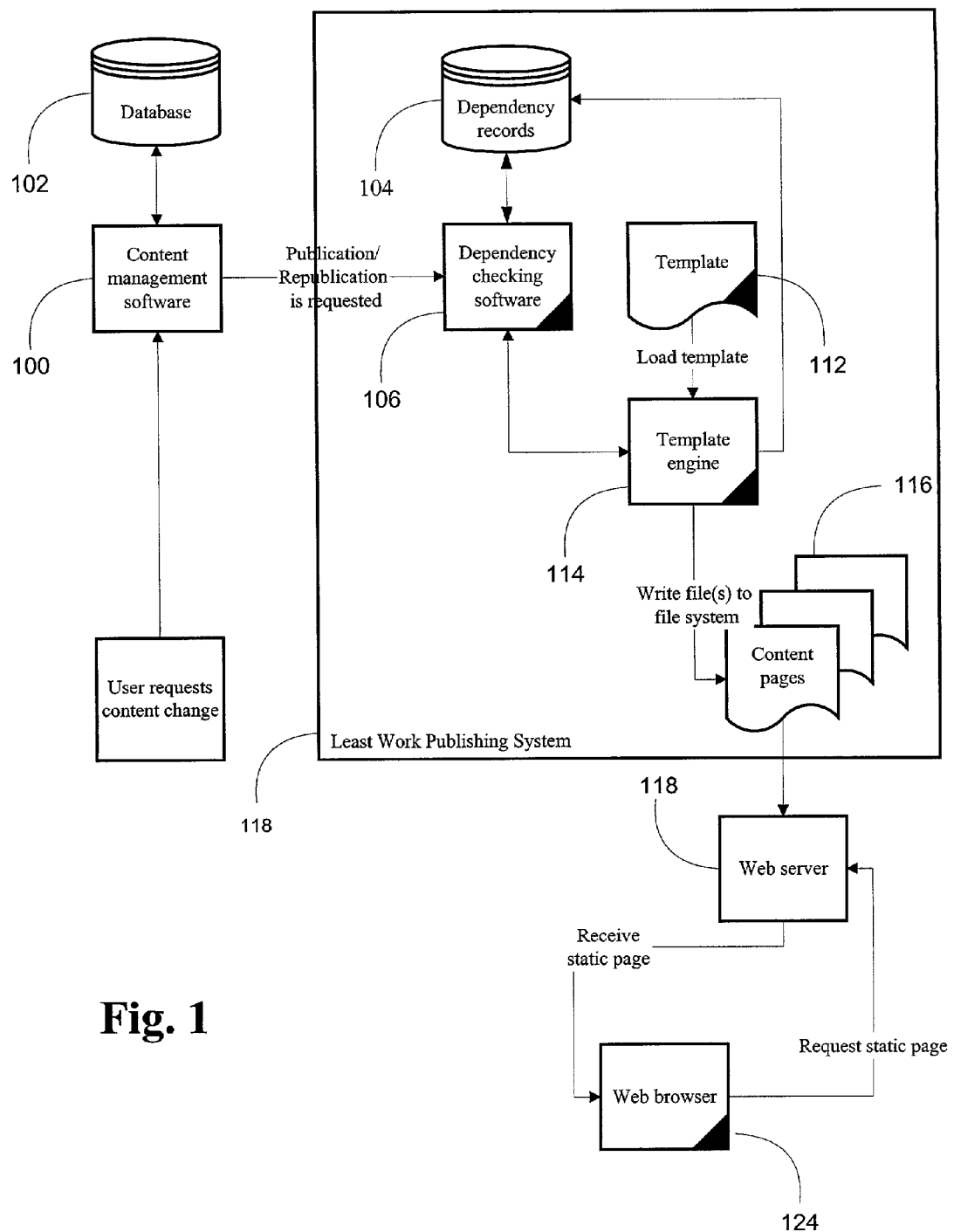
FIG. 1 is a block diagram presenting a configuration of various components used for least work publishing in a network environment according to one embodiment of the present invention.

With reference to FIGS. 1 through 3A, detailed embodiments of the invention are now presented. FIG. 1 presents an embodiment of the software elements of the instant invention in a network environment. The components are configured as follows. Managed content is held in a database 102 in the form of raw data, such as text, images, video or other digital content. Templates 112 are executed by the template engine 114 to retrieve raw data from the database 102, format the data, create structured files therefrom, then publish the files to disk. Each file thus "models" how the data is to be organized and formatted when it is presented as a content page to the requesting user. During this template execution, the dependency checking software 106 records information about the entire process, starting with data retrieval and ending with file publication.

Modifying content in the database 102 through use of the content management software 100 creates the need for republishing the affected content pages 116. A request for republication can be either initiated by the user, or by an external system or event, or by an automated task that is triggered to occur at a certain time/interval, or by a change to the data in the database 102. The actual method of generating such a request, however, is not limited by and does not affect the functioning of the present invention. The content management system 100 responds to a republication request by calling upon the dependency checking software to verify if the republication is indeed required. The dependency checking software 106 performs a dependency check to determine if any published files 116 have become stale as a result of changes made to content stored in the database 102 or to the templates 112 used to generate the published files 116. Based on the results of the check, the dependency checking software 106 instructs the template engine 114 to republish only the stale files and create new dependency records 104 for the republished files.

The content management software 100, dependency checking software 106, and template engine 114 are executed on a server computer. The server comprises a general purpose programmable digital microprocessor, also referred to as the Central Processor Unit (CPU). The CPU controls all the data processing functions of the computer. The CPU is electrically coupled to Random Access Memory, which provides storage for transient data the CPU needs quick access to. The CPU is further coupled to Read-Only Memory typically containing instructions used by the computer at startup. The content management software 100, dependency checking software 106, and template engine 114 are stored and program code in persistent memory, transient memory, or a combination of the two.

Managed content is stored in a database 102. The database 102 is preferably configured with a direct connection to a server computer, such as residing on a fixed storage device integrally connected to the server. Alternatively, the system utilizes a database 102 or databases located remotely from the server. Communication between the server and the remote database 102 is conducted across a network. The server computer further comprises a network adapter that controls data traffic being received and transmitted by the server.

Multiple database types are contemplated by the invention. The database 102, for example, consists of a relational database, an object oriented database, a hybrid relational-object oriented database, or a flat-file database. Where a relational database is used, managed content is stored and normalized among one ore more related tables. Tables are organized according to rows and columns. Columns are also referred to as fields. The intersection of a row and column is called a cell. Each cell contains a unit of raw data. The data represents a portion of the total site or page content, which may be text, images, sound, or any other type of digital content. Any unit of data can be identified by its table name, column name, and row number.

The database 102 also contains a "time stamp" column. Each cell in the column corresponds to a unit of raw data in the database 102. For newly created data, the time stamp indicates the creation time of the data. For modified data, the time stamp indicates the most recent modification time of the data.

The template 112 is executed by the template engine 114 to retrieve desired data from the database 102 and save it to a structured file in the file system 116, as previously described. When a template 112 is created or reprogrammed, its compilation date and time are recorded by the content management system 100. The template 112 is a piece of program code written in a language such as Java Server Pages (JSP), JavaScipt, VBScript, JScript, ASP (Active Server Pages), Python, and Perl. The template 112 consists primarily of database access methods and formatting instructions, which are executed by the template engine 114.

The database lookups and associated logic contained in the template 112 determine how the template engine 114 interacts with the database at runtime; the formatting, typically in HTML or XML, defines how the data represented when this template 112 is executed. The template 112 is typically written and saved in a designated directory as a file. Depending on the language used for creating template 112, the template 112 is either precompiled or interpreted at run time. Languages like Java Server pages compile the template 112 just before it is executed for the first time and every time changes are made to the template 112 thereafter.

Figure 2:
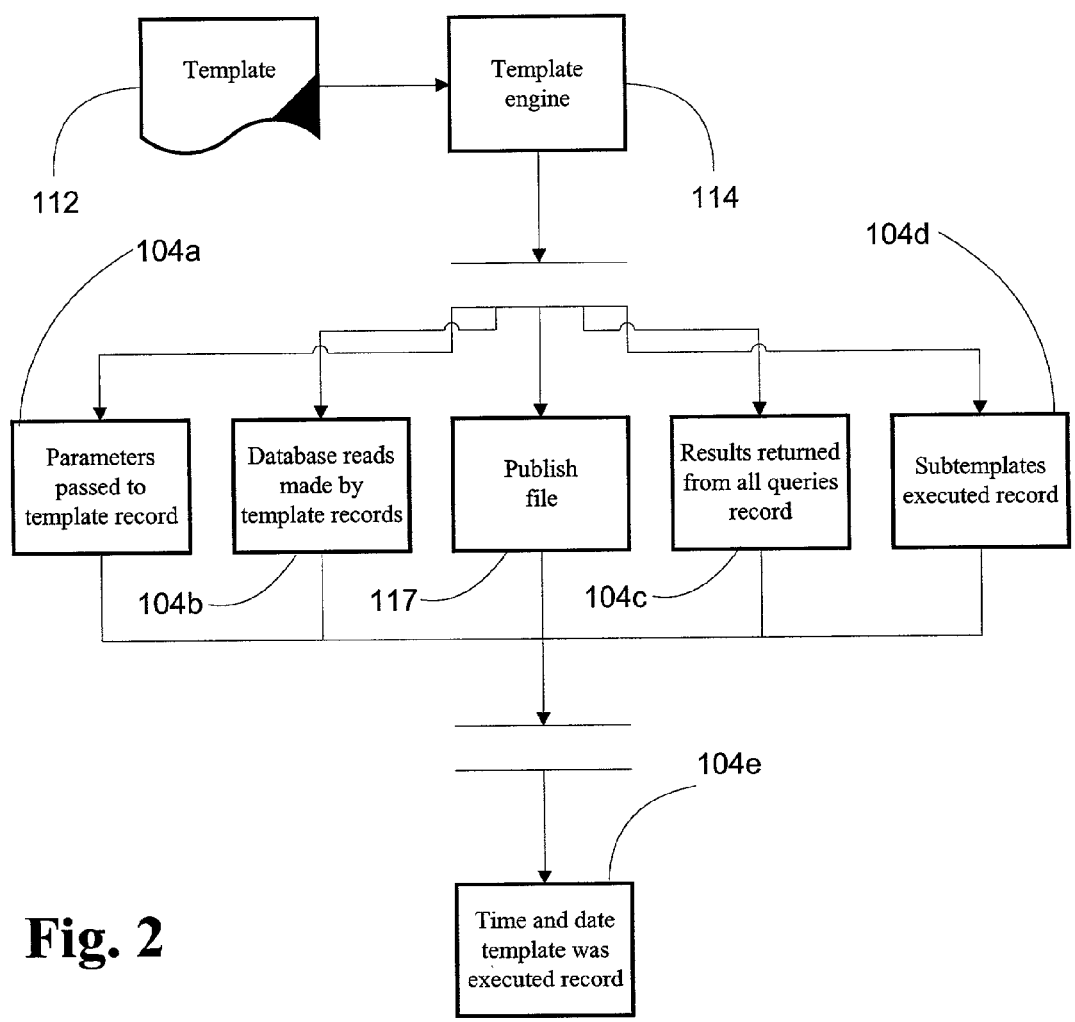
FIG. 2 is a block diagram presenting the dependency records that are created for use in dependency checking according to one embodiment of the present invention.

The template engine 114 executes the template 112 and creates dependency records 104a through 104e. With reference to FIG. 2, the dependency records 104a through 104e are as follows:

One dependency record 104a stores parameters that are passed to the template engine 114 for its use during the publication of a specific file 117. Parameters are name/value pairs of information that are passed to a template engine for its use during the publication of a specific file. Parameters are typically used for passing runtime data for the template engine. These might be presented in the file that is published to the file system or may be used in the program logic. A parameter can thus affect which data and how data appear in the published file, and hence the content page.

Another dependency record 104b stores reads made from the database 102, e.g., which cells in the database 102 are read by the template engine 114 for the data they contain.

Another dependency record 104c stores queries that are run on the database 102 by the template engine 114, along with the number of records that are returned by each query. The syntax of a query is SELECT COLUMNA, COLUMNB, ... FROM TABLE WHERE CONDITION. The column names, table name, and WHERE clause are stored as a dependency for each query performed by the template.

Another dependency record 104*d* stores information about which sub-templates, if any, are called by the template 112.

Another dependency record 104*e* stores the template execution time, or alternatively, the file publication date and time.

Figure 3:
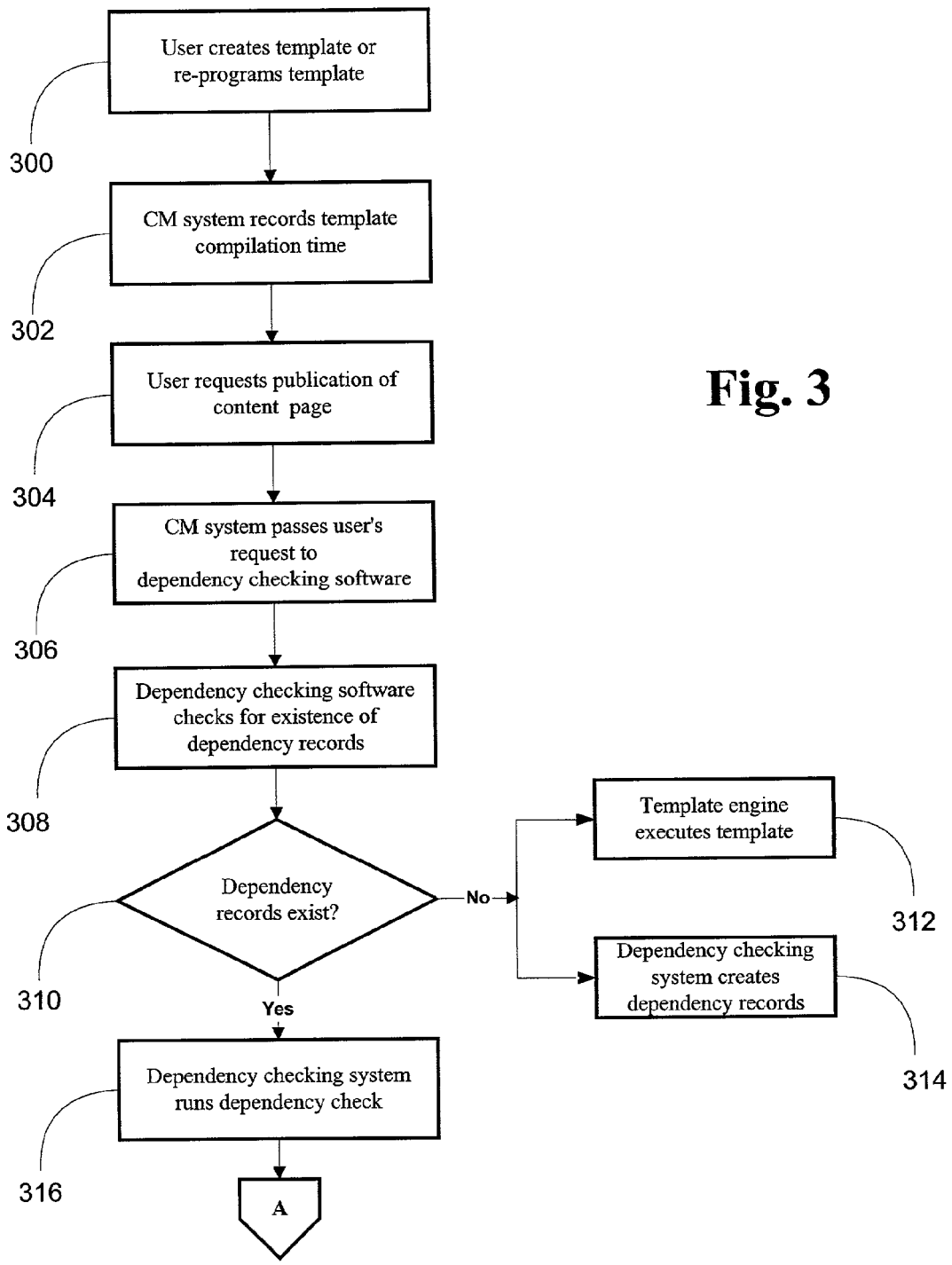
FIG. 3 is a flow diagram detailing the process of initial publication or republication of a static content page according to one embodiment of the present invention.

FIG. 3 comprises a flow diagram presenting the publication and dependency checking processes. Users create or re-program a template 300. The content management system records the template compilation time 302. The user or an automated system submits a request 304 to the content management system to publish content pages. The content management system responds by passing the user's request to the dependency checking software 306. The dependency checking system runs a test 308 to determine if dependency records exist 310. If dependency records do not exist for the content page that is to be published, the dependency checking system determines that the content page is being published for the first time, and invokes the template engine to execute the template 312 and to create dependency records for the content page 314. If, however, dependency records are found the dependency checking system is invoked to determine if the page is out of date 316.

Figure 3A:
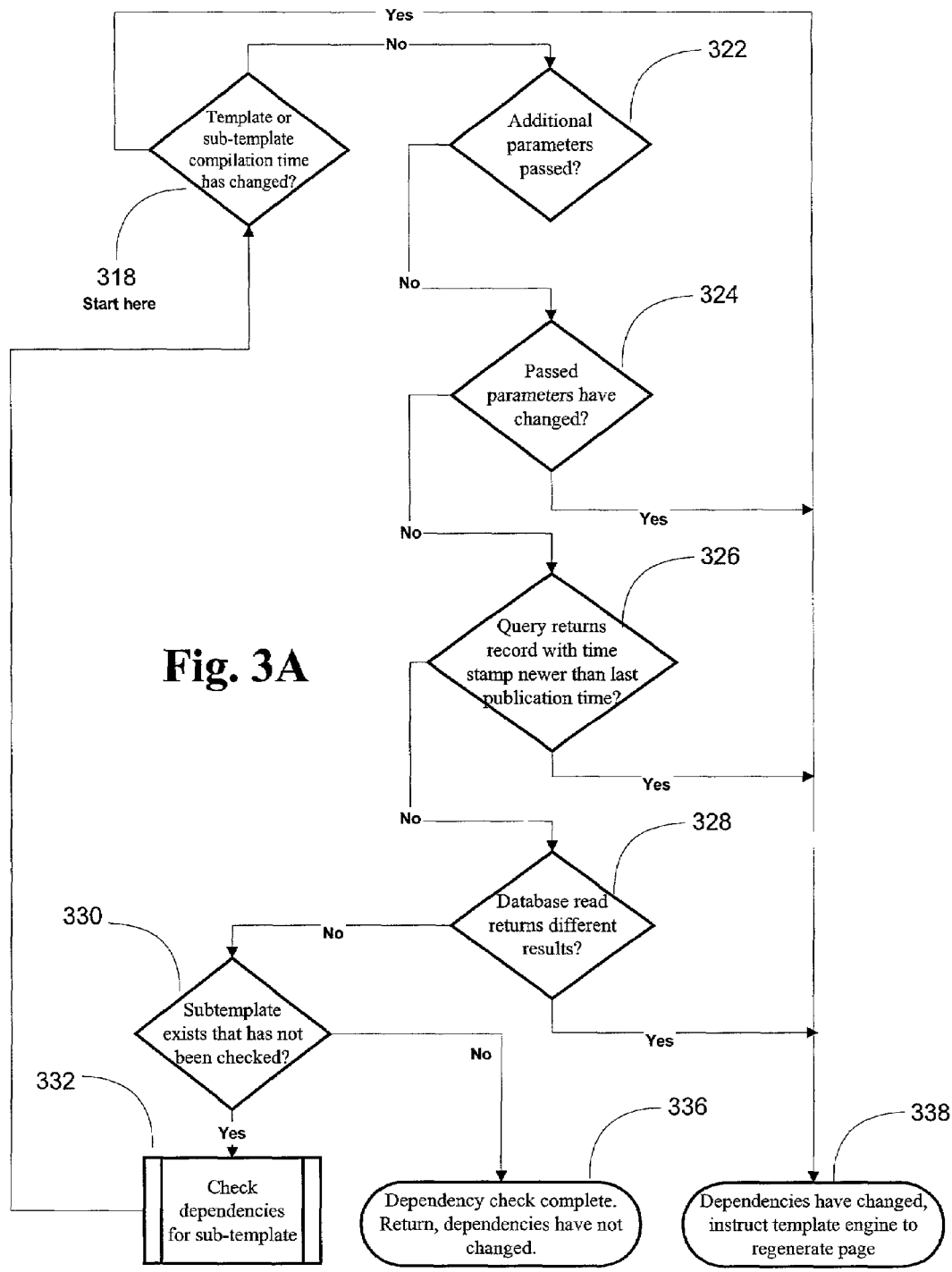
FIG. 3A is a flow diagram detailing the process of dependency checking, which occurs during the processing of republication requests.

Turning to FIG. 3A, dependency checking begins with process 318 and results in one of two possible outcomes: (1) After the template and all its sub-templates have been evaluated for dependencies and the dependencies are determined to have not changed, the check ends in result 336, e.g., the content page is 'not stale' and therefore not republished; (2) If any one of the checks determines that dependencies have changed 338, the content page is determined to be stale, dependency checking stops immediately, and the template engine is instructed to republish the stale content page. This method creates an efficient 'fail fast' system, wherein once a content page's staleness is determined, the check no longer needs to continue.

Dependency checking begins by comparing the template compilation time against the publication time of a content page that is derived from the template 318. If the template compilation time stamp, recorded by the content management system, is more recent than the file publication time, which is stored in a dependency record, then the template is determined to have been changed after the content page was last published. The content page is thus determined to be stale and must be republished. This results in the template engine republishing the page 338. If, however, the compilation time has not changed, then the dependency check continues with processes 322 and 324, which test the parameters passed to the template.

The parameter checking processes 322 and 324 compare the currently passed parameters against the previously passed parameters, which are stored in dependency records created during the last publication of the content page. If process 322 determines that additional parameters are being passed to the template, then the existing content page is determined to be stale and must be republished. This results in the template engine republishing the page 338. If, however, additional parameters are not passed, processing continues to step 324, which checks the values of passed parameters. If process 324 determines that the value of any passed parameter has changed, then the content page is determined to be stale and must be republished. This results in the template engine republishing the page 338. If, however, the parameters have not changed 324, dependency checking continues to test for changes in queries.

The query checking process 326 compares the results of current queries against the results of previously run queries, which are stored in a dependency record. Process 326 first runs queries on the database by using the current template. Process 326 then compares the number of records returned by the current query to the number of records recorded in the dependency record. If process 326 determines the number of records to have changed since the last publication of the content page, then the content page is determined to be stale and must be republished. This results in the template engine republishing the page 338. If, however, process 326 does not result in a determination that the page is stale, the process 326 continues by comparing the time stamps for the records retrieved by the queries against the file publication time. If the time stamps of the retrieved records are more recent than the file publication time, then modification to the database is determined to have taken place after the content page was last published. The content page is thus determined to be stale and must be republished. This results in the template engine republishing the page 338. If, however, query check 326 does not result in republication 338, dependency checking continues to the next process 328, which tests for changes in the database to those records that are read by the template.

The process 328 for checking database reads uses time stamps to compare the currently read individual fields in the database against the previously read individual fields, which are stored in a dependency record. If the time stamp of a current database read is newer than the creation time of the database reads stored in the dependency record, the data is determined to have been changed after the publication of the content page. The content page is thus determined to be stale and must be republished. This results in the template engine republishing the page 338. If, however, the database check 328 does not result in republication 338, dependency checking continues to the next process 330, which tests for the existence of sub-templates and dependency checks against them.

The template checking processes determines whether one or more sub-templates exist for a given template, and if so, whether dependencies have changed for the sub-template(s). Each sub-template is checked for dependencies by the same processes as explained above 318 through 330. Each sub-template in itself may call other sub-templates, and so on. All sub-templates follow the same pattern of checks resulting in either of the two outcomes, 336 or 338.

After the template and all sub-templates have been evaluated for dependencies and all the checks result in dependencies not having been changed, the page is deemed 'not stale' and is not republished. If any of these checks result in 338, the dependency check stops immediately and instructs the template engine that the page is stale and needs to be republished. This creates an efficient 'fail fast' system, where in once a page's staleness is determined, the check no longer proceeds.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A computerized system for content management that automatically determines when a static content page contains out of date content items as a result of changes made to the content items in a data source, the computerized system comprising:

a template engine for executing templates to generate a static content page, the template engine operative to generate a static content page comprising content items selectively retrieved from a data source and arranged on the static content page as defined by the template, each content item in the data source being associated with time stamp information to indicate the last time the content item was modified;

a dependency record for storing information regarding a relationship between content items that comprise the static content page and the content items stored in the data source and time parameter information associated with the content items that comprise the static content page;

dependency checking software for comparing information contained in the dependency record with information contained in the data source for each content item that comprises the static content page, determining through the comparison those static content pages that contain content items that have been modified in the data source, and instructing the template engine to re-generate a static content page that contains modified content items; and content management software to manage content items and operative to issue instructions to the dependency checking software to regenerate a static content page upon modification of a managed content item.

2. The system of claim 1, wherein a plurality of dependency records are used to store the relationship between the content items that comprises the static content page and the content items stored in the data source.

3. The system of claim 1, wherein the static content page generated by the template engine comprises markup code.

4. The system of claim 3 wherein the markup code is HTML.

5. The system of claim 3 wherein the markup code is XML.

6. The system of claim 1, wherein the dependency record contains parameters comprising name/value pairs of the information that are passed to the template engine to generate the static content page.

7. The system of claim 1, wherein the dependency record comprises the address within the data source of the content items that comprise the static content page.

8. The system of claim 1, wherein the dependency record comprises queries executed by the template engine to retrieve content items from the data source.

9. The system of claim 1, wherein the dependency record comprises sub-template scripts used by the template engine to generate a static content page.

10. The system of claim 1, wherein the dependency record comprises the time the static content page was generated.

11. The system of claim 10, wherein the dependency record comprises the date the static content page was generated.

12. The system of claim 1, the content management software operative to issue instructions to the dependency checking software to re-generate a static content page upon modification of a template.

13. The system of claim 1 comprising one or more dependency records to store information regarding the relationship between a template and the content items that comprise the static content page.

14. The system of claim 1, wherein the dependency checking software provides for comparison of time parameter information associated with a respective content item that comprises the static content page and time stamp information associated with a respective content item in the data source.

15. The system of claim 14, wherein the time parameter information comprises a template execution time or a file publication time.

16. A method for content management that automatically determines when a static content page contains out of date content items as a result of changes made to the content items in a data source, the method comprising:

executing templates in a template engine to generate a static content page, the template engine operative to generate a static content page comprising content items selectively retrieved from a data source and arranged on the static content page as defined by the template, each content item in the data source being associated with time stamp information to indicate the last time the content item was modified, wherein the static content page is saved to a disk;

storing information in a dependency record, the information regarding a relationship between content items that comprise the static content page and the content items stored in the data source and time parameter information associated with the content items that comprise the static content page;

comparing information contained in the dependency record with information contained in the data source for each content item that comprises the static content page using dependency checking software;

determining through the comparison those static content pages that contain content items that have been modified in the data source;

instructing the template engine to re-generate a static content page that contains modified content items; and managing content items using content management software operative to issue instructions to the dependency checking software to regenerate a static content page upon modification of a managed content item.

17. The method of claim 16, wherein a plurality of dependency records are used to store the relationship between the content items that comprises the static content page and the content items stored in the data source.

18. The method of claim 16, wherein the static content page generated by the template engine comprises markup code.

19. The method of claim 18, wherein the markup code is HTML.

20. The method of claim 18, wherein the markup code is XML.

21. The method of claim 16, wherein the dependency record contains parameters comprising name/value pairs of the information that are passed to the template engine to generate the static content page.

22. The method of claim 16, wherein the dependency record comprises the address within the data source of the content items that comprise the static content page.

23. The method of claim 16, wherein the dependency record comprises queries executed by the template engine to retrieve content items from the data source.

24. The method of claim 16, wherein the dependency record comprises sub-template scripts used by the template engine to generate a static content page.

25. The method of claim 16, wherein the dependency record comprises the time the static content page was generated.

26. The method of claim 25, wherein the dependency record comprises the date the static content page was generated.

27. The method of claim 16, the content management software operative to issue instructions to the dependency checking software to re-generate a static content page upon modification of a template.

28. The method of claim 16 comprising one or more dependency records to store information regarding the relationship between a template and the content items that comprise the static content page.

29. The method of claim 16, wherein the dependency checking software provides for comparison of time parameter information associated with a respective content item that comprises the static content page and time stamp information associated with a respective content item in the data source.

30. The method of claim 29, wherein the time parameter information comprises a template execution time or a file publication time.

* * * * *